US011222224B2

(12) United States Patent
Lee et al.

(10) Patent No.: US 11,222,224 B2
(45) Date of Patent: Jan. 11, 2022

(54) AUTOMATIC IMAGE SYNTHESIZING APPARATUS AND METHOD

(71) Applicant: HYUNDAI MOBIS CO., LTD., Seoul (KR)

(72) Inventors: Dong Yul Lee, Yongin-si (KR); Jin Aeon Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 17 days.

(21) Appl. No.: 16/802,788

(22) Filed: Feb. 27, 2020

(65) Prior Publication Data

US 2020/0279122 A1 Sep. 3, 2020

(30) Foreign Application Priority Data

Feb. 28, 2019 (KR) .................. 10-2019-0023543

(51) Int. Cl.
| | | |
|---|---|---|
| *G06K 9/00* | (2006.01) | |
| *G06K 9/20* | (2006.01) | |
| *G06K 9/62* | (2006.01) | |
| *G06N 3/08* | (2006.01) | |
| *G06T 7/11* | (2017.01) | |
| *G06N 3/04* | (2006.01) | |

(52) U.S. Cl.
CPC ....... *G06K 9/2054* (2013.01); *G06K 9/00791* (2013.01); *G06K 9/6201* (2013.01); *G06K 9/6256* (2013.01); *G06K 9/6267* (2013.01); *G06N 3/0454* (2013.01); *G06N 3/088* (2013.01); *G06T 7/11* (2017.01)

(58) Field of Classification Search
CPC ............. G06K 9/2054; G06K 9/00791; G06K 9/6201; G06K 9/6256; G06K 9/6267; G06T 7/11; G06N 3/0454; G06N 3/088
See application file for complete search history.

(56) References Cited

U.S. PATENT DOCUMENTS 9,619,733 B2   4/2017  Kim et al.
10,311,335 B1* 6/2019  Kim .................. G06K 9/00664
10,713,794 B1* 7/2020  He ........................ G06N 3/0454
(Continued)

FOREIGN PATENT DOCUMENTS

KR        10-1581112       12/2015
KR     10-2018-0125885     11/2018

*Primary Examiner* — Ping Y Hsieh
*Assistant Examiner* — Xiao Liu
(74) *Attorney, Agent, or Firm* — H.C. Park & Associates, PLC

(57) ABSTRACT

An automatic image synthesizing apparatus including an image search unit configured to search for and extract a frame image having an object to be learned or replaced from a plurality of frame images inputted through a vehicle camera; an instance object detection unit configured to detect an instance object to be learned or replaced from the extracted frame image; an image extraction and object class information detection unit configured to extract mask-segmented objects from the extracted frame image and form a data-structure; a standard image mapping unit configured to map a standard image matching a class value of the mask-segmented object; and a generative adversarial network (GAN) network unit configured to receive the selected standard image and the mask segmentation image and learn a replacement image or produce a replacement image based on a learning result.

11 Claims, 6 Drawing Sheets

(56) References Cited

U.S. PATENT DOCUMENTS

| 2013/0215270 | A1* | 8/2013 | Murashita | G06T 7/74 |
| | | | | 348/148 |
| 2015/0279048 | A1 | 10/2015 | Kim et al. | |
| 2018/0322366 | A1 | 11/2018 | Lim et al. | |
| 2018/0374253 | A1 | 12/2018 | Yu et al. | |

* cited by examiner

FIG.3

| Group | Class ID |
|---|---|
| Vehicle | Car |
| | Truck |
| | Bus |
| | Train(on rails) |
| | Caravan |
| | Trailer |
| two-wheel vehicle | Bicycle |
| | Motorcycle |
| | Kick scooter |
| | Wheelchair |
| | Stroller |
| static object | Pole |
| | Traffic light |
| | Traffic sign |

| Model |
|---|
| LF SONATA |
| AD AVANTE |
| TM SANTAFE |
| ⋮ |

FIG.6

AUTOMATIC IMAGE SYNTHESIZING APPARATUS AND METHOD

CROSS-REFERENCE TO RELATED APPLICATION

This application claims priority from and the benefit of Korean Patent Application No. 10-2019-0023543, filed on Feb. 28, 2019, which is hereby incorporated by reference for all purposes as if fully set forth herein.

BACKGROUND

Field

Exemplary embodiments of the invention relate generally to disclosure relate to an automatic image synthesizing apparatus and method and, more specifically, to an automatic image synthesizing apparatus and method, which enable various datasets of a stylized thing (or object) to be secured through image synthesis using a segmentation mask image of things (or objects) detected in an image and a previously secured standard image database.

Discussion of the Background

In general, image processing is called picture processing, and digital image processing by a computer has been put to practical use in many application fields, such as space observation, medicine, photographic analysis, design, and various types of pattern recognition, due to rapid advance in memory devices. TV cameras, CCD cameras and the like are used as image input devices, various output devices for hardware and software for copying are used, and some special techniques for processing digitalized images with a computer have been developed.

Recently, with the rapid development in digital cameras and smartphone cameras, smartphone users generate their own contents in various forms by editing and reconstructing images. However, the related image edition process is provided only to simply adjust the brightness or saturation of an image or adjust the size of an object included in the image. At present, there is no system that provides an image analysis and editing process function of in-depth analyzing an image generated by a user to recreate or reconstruct the image into a new creation.

In the related art, image processing and computer vision are utilized to process images by processing them on a computer. At present, image changing software or a similar tool may change an image, store the image as a specific data type (jpg, png, gif, psd and the like), and use the data only on software. This data may be processed in another type using other software, but only desired data may not be extracted and reprocessed.

The above information disclosed in this Background section is only for understanding of the background of the inventive concepts, and, therefore, it may contain information that does not constitute prior art.

SUMMARY

Various embodiments are directed to providing an automatic image synthesizing apparatus and method, which enable various datasets of a stylized thing (or object) to be secured through image synthesis using a segmentation mask image of things (or objects) detected in an image and a previously secured standard image database.

In an embodiment, an automatic image synthesizing apparatus includes: an image search unit configured to search for and extract a frame image having an object to be learned or replaced from a plurality of frame images inputted through a vehicle camera; an instance object detection unit configured to detect an instance object to be learned or replaced from the extracted frame image; an image extraction and object class information detection unit configured to extract mask-segmented objects from the extracted frame image and form a data-structure; a standard image mapping unit configured to map a standard image matching a class value of the mask-segmented object; and a generative adversarial network (GAN) network unit configured to receive the selected standard image and the mask segmentation image and learn a replacement image or produce a replacement image based on a learning result.

In the present disclosure, the image search unit searches for and extracts a frame image to be used in a learning phase for replacing a specific object image included in the searched frame image and a production phase for generating an object image to be replaced using learned learning information.

In the present disclosure, the instance object detection unit classifies objects in the extracted frame image in units of instances, and performs mask segmentation by finding segmentation for each pixel and class information of a corresponding object.

In the present disclosure, the standard image is stored in a standard image database.

In the present disclosure, the standard image database includes a set of images of five surfaces, except for a bottom surface, when a dynamic object is viewed from an angle of a cube, and stores, in a case of a static object such as a sign and a traffic light, only a front surface having only information required for driving, as a standard image.

In the present disclosure, the standard image mapping unit maps a standard image of an object to be learned in the learning phase and maps a standard image of an object to be replaced in the production phase.

In the present disclosure, the GAN network unit learns by repeatedly processing the standard image and the mask segmentation image until the standard image and the mask segmentation image are recognized as substantially the same image, and stores a learning result through a learning unit.

In another embodiment, an automatic image synthesizing method includes: searching for and extracting, by an image search unit, a frame image having an object to be learned or replaced from a plurality of frame images inputted through a vehicle camera; detecting, by an instance object detection unit, an instance object to be learned or replaced from the extracted frame image; extracting, by an image extraction and object class information detection unit, mask-segmented objects from the extracted frame image and forming a data-structure; mapping, by a standard image mapping unit, a standard image matching a class value of the mask-segmented object; and receiving, by a GAN network unit, the selected standard image and the mask segmentation image and learning a replacement image or producing a replacement image based on a learning result.

In the present disclosure, in the searching for and extracting of the frame image, the image search unit searches for and extracts a frame image to be used in a learning phase for replacing a specific object image included in the searched frame image and a production phase for generating an object image to be replaced using learned learning information.

In the present disclosure, in the detecting of the instance object, the instance object detection unit classifies objects in the extracted frame image in units of instances, and performs mask segmentation by finding segmentation for each pixel and class information of a corresponding object.

In the present disclosure, in the mapping of the standard image, the standard image mapping unit maps a standard image of an object to be learned in the learning phase and maps a standard image of an object to be replaced in the production phase.

In the present disclosure, in the learning of the replacement image or producing of the replacement image, the GAN network unit learns by repeatedly processing the standard image and the mask segmentation image until the standard image and the mask segmentation image are recognized as substantially the same image, and stores a learning result through a learning unit.

According to one aspect of the present disclosure, it is possible to secure various datasets of a stylized thing (or object) through image synthesis using a segmentation mask image of things (or objects) detected in an image and a previously secured standard image database.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 3 is an exemplary diagram illustrating a table classifying a class for designating an object recognition range in FIG. 1.

FIG. 6 is an exemplary diagram illustrating a traffic light as a fixed object to be recognized in FIG. 1.

DETAILED DESCRIPTION

Figure 1:
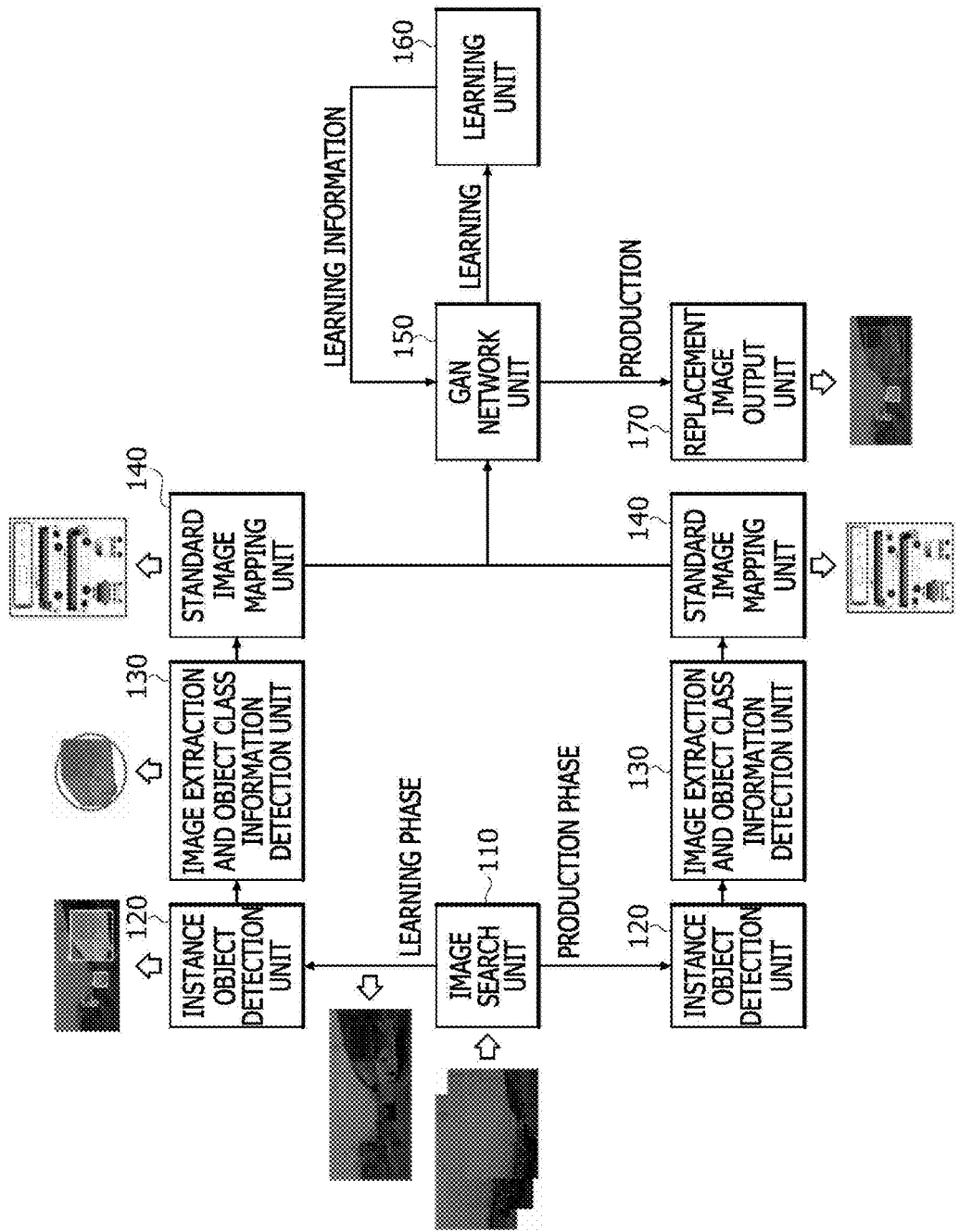
FIG. 1 is an exemplary diagram illustrating a schematic configuration of an automatic image synthesizing apparatus in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an embodiment of an automatic image synthesizing apparatus and method in accordance with the present disclosure will be described with reference to the accompanying drawings.

It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

FIG. 1 is an exemplary diagram illustrating a schematic configuration of an automatic image synthesizing apparatus in accordance with an embodiment of the present disclosure.

As illustrated in FIG. 1, the automatic image synthesizing apparatus in accordance with the present embodiment includes an image search unit 110, an instance object detection unit 120, an image extraction and object class information detection unit 130, a standard image mapping unit 140, a GAN network unit 150, a learning unit 160, and a replacement image output unit 170.

The image search unit 110 receives a plurality of images (for example, a plurality of frame images) inputted through a vehicle camera (for example, a black box, a forward monitoring camera and the like) (not illustrated), and searches for and extracts an image (for example, a frame image) having an object to be learned (or replaced).

The image search unit 110 searches for and extracts an image (that is, a frame image selected from a plurality of frame images) to be used in a learning phase (that is, a learning phase for replacing a specific object image included in a searched frame image) and a production phase (that is, a phase for generating an object image replaced using learned learning information).

The instance object detection unit 120 detects an instance object (for example, an object to be learned or replaced) from the extracted image (for example, a frame image).

Furthermore, the instance object detection unit 120 classifies objects in the extracted image (for example, a frame image) in units of instances by utilizing a predetermined technique (for example, a Mask R CNN technique), and performs mask segmentation by finding segmentation for each pixel and class information (for example, indicating a kind of an object such as a bus, a bicycle, and a truck) of a corresponding object.

The Mask R CNN technique, which is a technology proposed in 2017, is one of the best algorithms for recognizing an instance object in an image, and all pixels corresponding to the instance object are found in the image.

Here, there are various objects to be detected from the image (for example, a frame image), and a class is defined by grouping objects having substantially the same attributes among them. The type of the class varies depending on an application to be applied. In such a case, the objects may be substantially the same object or different objects depending on the defined type of the class.

For example, when there is a sky class, two or more sky areas isolated from each other may appear in an image (for example, a frame image), and these areas become substantially the same object. Furthermore, in the case of different objects, such as vegetables, which are difficult to discriminate due to an ambiguous boundary, only a class is defined without object discrimination. However, when defining classes such as cars, pedestrians, and bicycles, since the boundary between the objects is clear and the objects are information important to discriminately recognize as the occasion demands, each object is essentially discriminated (see FIG. 3).

In such a case, each object discriminated as described above is called an instance object.

For reference, an object of a main thing required for driving further includes a large class and all detained types corresponding to a corresponding object as illustrated in FIG. 3. For example, a car may be classified into sedan, hatchback, SUV and the like, large, medium, small and the like, or A-seg, B-seg, and C-seg as a middle class, or may also be classified into all vehicles (for example, LF/NF SONATA, AVANTE and the like) existing in a country (for example, South Korea) as a small class.

Here, mapping to a predefined class in units of pixels in an image is called segmentation, and grouping pixels segmented between substantially the same instances or classes into an image is called the mask segmentation. More precisely, the present disclosure recognizes an instance object and instance mask segmentation is abbreviated as mask segmentation.

The instance object detection unit 120 is equally used in both the learning phase and the production phase.

The image extraction and object class information detection unit 130 extracts the mask-segmented objects from the extracted image (for example, a frame image), and forms a data-structure.

The image extraction and object class information detection unit 130 is equally used in both the learning phase and the production phase.

The standard image mapping unit 140 maps a standard image matching a class value (or ID) of the mask-segmented object. The standard image is stored in a standard image DB (that is, a database) (see FIG. 4).

That is, an image connected to the predefined standard image DB (database) may be found based on the class information. The standard image mapping unit 140 is equally used in both the learning phase and the production phase. However, The standard image mapping unit 140 maps a standard image of an object to be learned in the learning phase and maps a standard image of an object to be replaced in the production phase.

Figure 4:
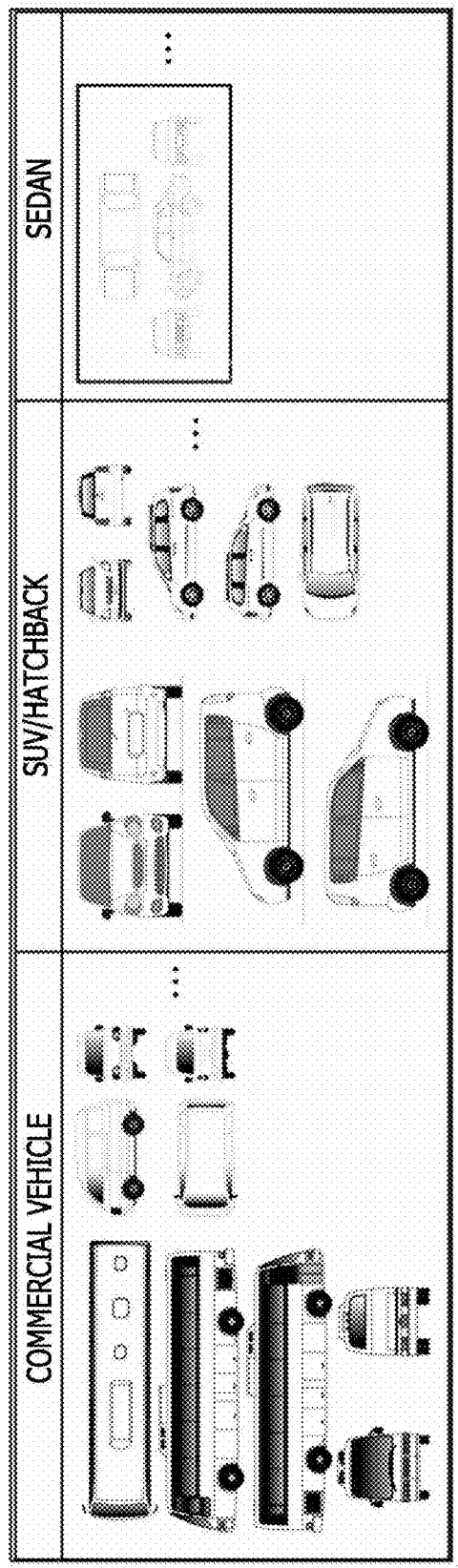
FIG. 4 is an exemplary diagram for explaining a standard image database in FIG.
Figure 5:
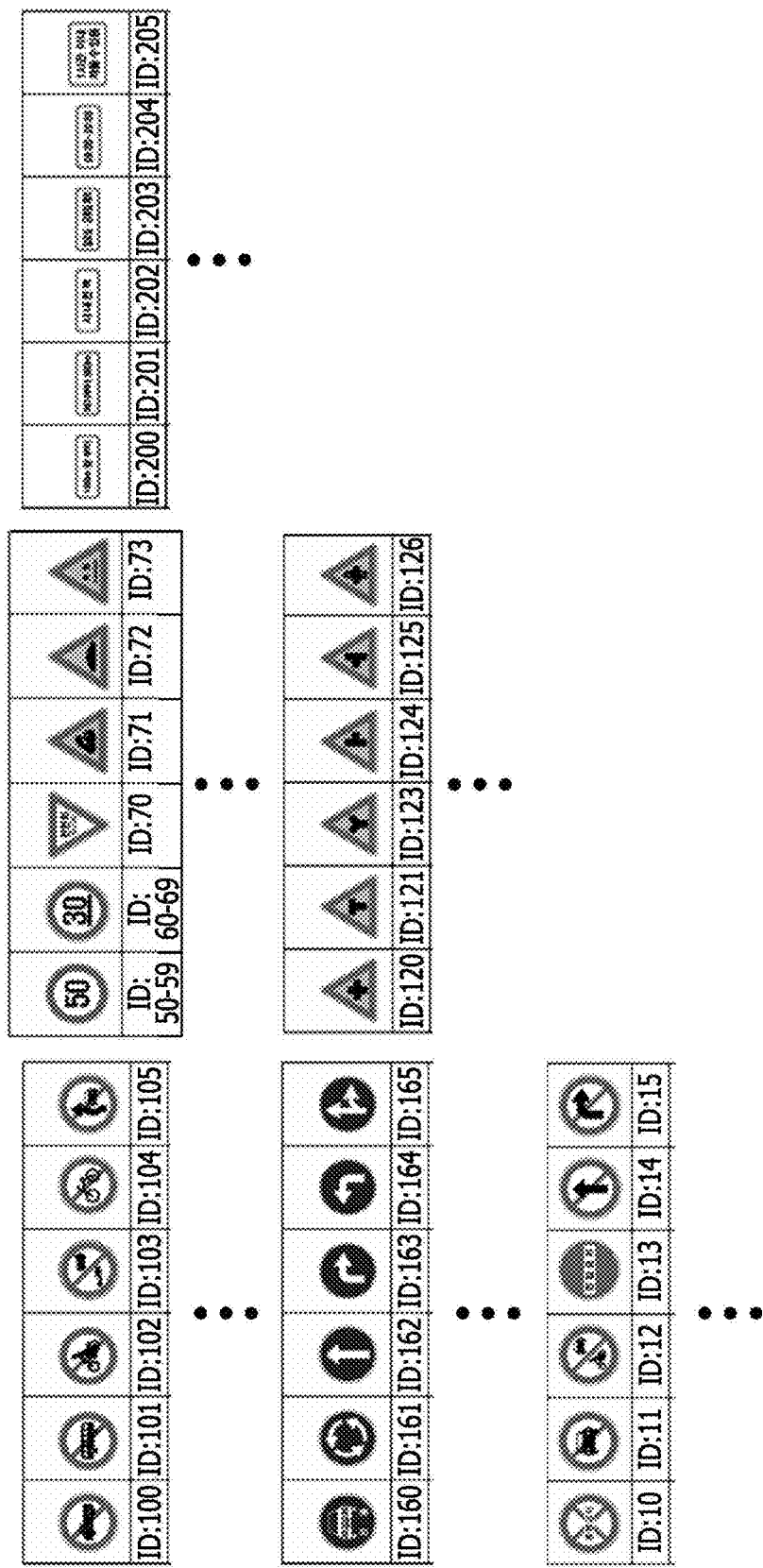
FIG. 5 is an exemplary diagram illustrating a sign as a static object to be recognized in FIG. 1.
Figure 6:
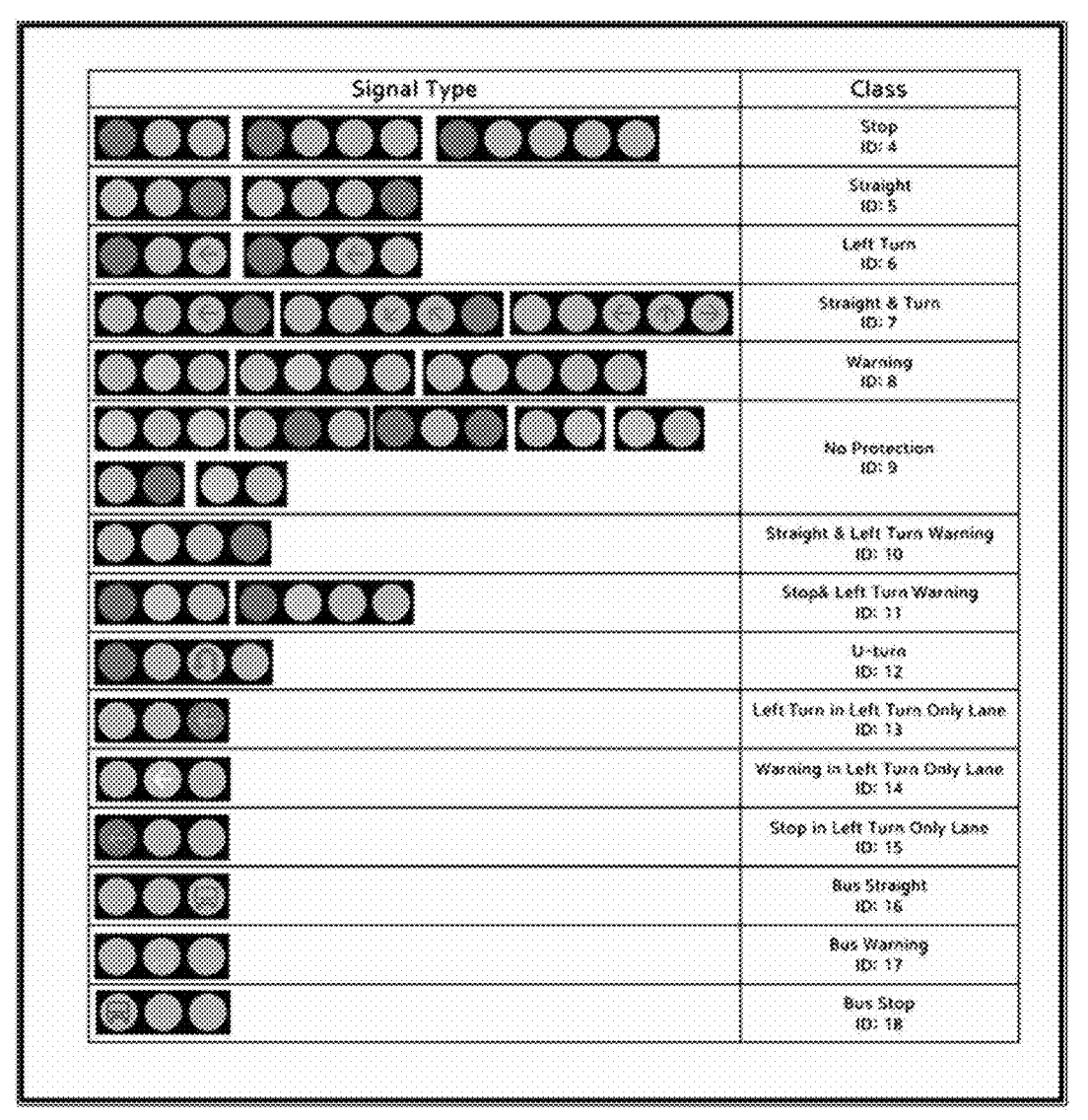

In such a case, in the present embodiment, as illustrated in FIG. 4, the standard image refers to a set of images of five surfaces, except for a bottom surface, when a dynamic object such as a vehicle and a two-wheel vehicle is viewed from an angle of a cube, and in the case of a static object such as a sign (see FIG. 5) and a traffic light (see FIG. 6), the standard image refers to only a front surface having only information required for driving.

The GAN network unit 150 links (receives) the selected standard image and the mask segmentation image to (from) a publicly-known GAN network, and processes the received images.

For reference, the GAN (generative adversarial network) network is a technology proposed by Ian Goodfellow in 2014 and is an unsupervised generative model that allows two networks between a generator (G) and a discriminator (D) to learn in an adversarial manner, wherein the generator (G) learns to receive a value z generated by Zero-Mean Gaussian to generate data similar to actual data and the discriminator (D) discriminates the actual data and fake data generated by the generator (G).

When both the standard image and the mask segmentation image are put into the GAN network unit 150, the GAN network unit 150 learns by repeatedly processing the two images (for example, vector (that is, a size, an angle and the like) adjustment) until the two images are recognized as substantially the same image. That is, the GAN network unit 150 repeatedly processes the two images until the discriminator (D) recognizes the two images as substantially the same image, and allows the generator (G) to learn.

The learning unit 160 stores a learning result (that is, a vector information learning result) of the GAN network unit 150. Furthermore, the learning unit 160 may repeatedly learn another image (for example, a frame image) of the image search unit 110 and other instance objects in the extracted specific image (for example, a frame image).

When the learning for a specific instance object is completed through the GAN network unit 150 as described above, a standard image for replacing the specific instance object (that is, a mask segmentation image) based on the learning result (that is, the vector information learning result) for the learned instance object is received from the standard image mapping unit 140.

That is, the GAN network unit 150 generates a replacement image capable of replacing the mask segmentation image with a newly selected standard image.

The replacement image output unit 170 outputs the replacement image generated through the GAN network unit 150 (that is, replaced from the mask segmentation image).

Figure 2:
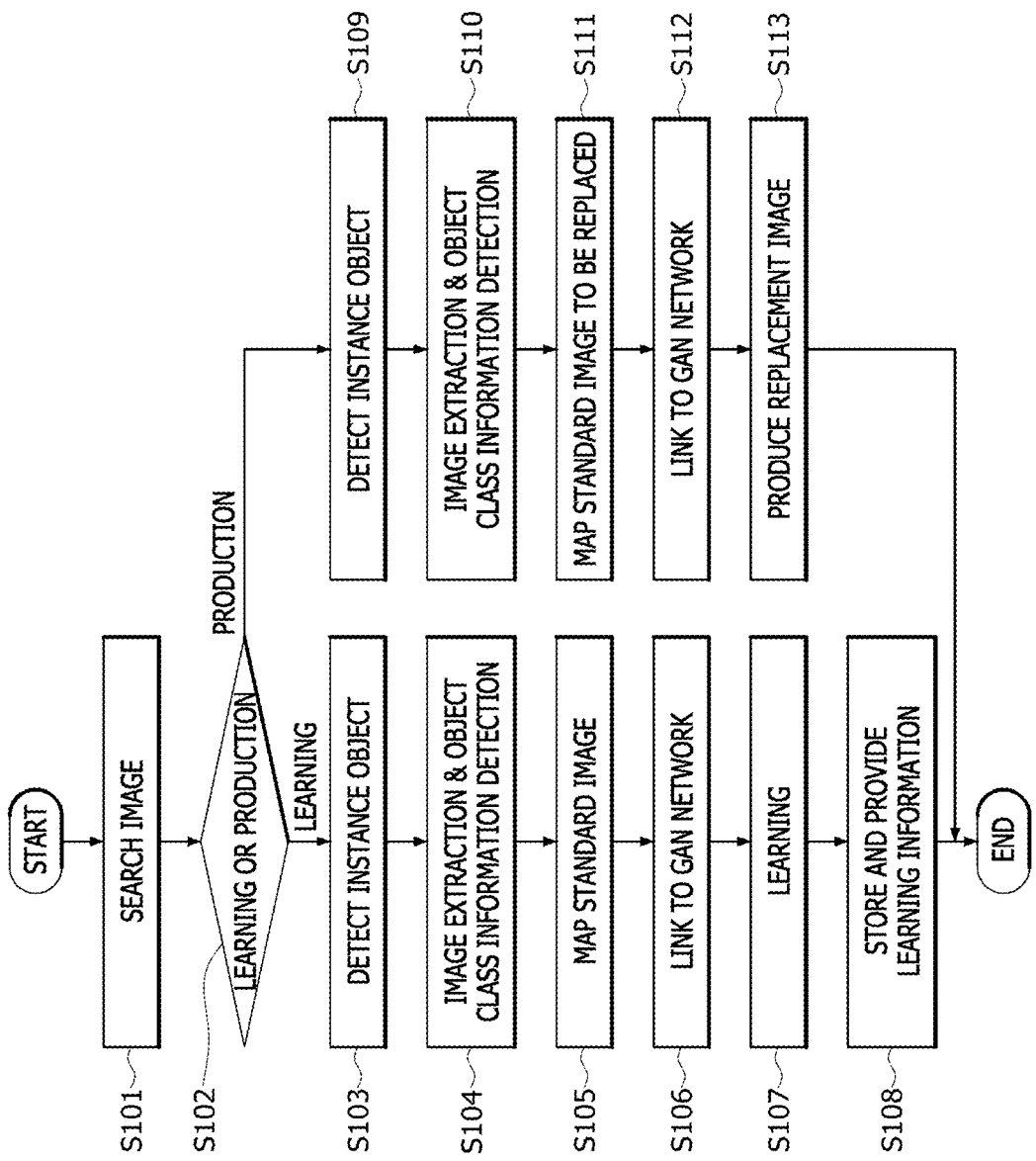
FIG. 2 is a flowchart for explaining an automatic image synthesizing method in accordance with an embodiment of the present disclosure.

FIG. 2 is a flowchart for explaining an automatic image synthesizing method in accordance with an embodiment of the present disclosure.

As illustrated in FIG. 2, the image search unit 110 receives a plurality of images (for example, a plurality of frame images) inputted through a vehicle camera (for example, a black box, a forward monitoring camera and the like) (not illustrated), and searches for and extracts an image (for example, a frame image) having an object to be learned (or replaced) (S101).

When a preset mode is a learning mode (learning of S102), the instance object detection unit 120 detects an instance object (for example, an object to be learned or replaced) from the extracted image (for example, a frame image) (S103).

The instance object detection unit 120 classifies objects in the extracted image (for example, a frame image) in units of instances by utilizing a predetermined technique (for example, a Mask R CNN technique), and performs mask segmentation by finding segmentation for each pixel and class information (for example, indicating a kind of an object such as a bus, a bicycle, and a truck) of a corresponding object.

The image extraction and object class information detection unit 130 extracts the mask-segmented objects from the extracted image (for example, a frame image), and forms a data-structure.

The standard image mapping unit 140 maps a standard image matching a class value (or ID) of the mask-segmented object (S105).

The GAN network unit 150 links (receives) the selected standard image and the mask segmentation image to (from) a publicly-known GAN network, and processes the received images (S106).

When both the standard image and the mask segmentation image are put into the GAN network unit 150, the GAN network unit 150 learns by repeatedly processing the two images (for example, vector (that is, a size, an angle and the like) adjustment) until the two images are recognized as substantially the same image (S107).

The learning unit 160 stores a learning result (that is, a vector information learning result) of the GAN network unit 150, and provides the GAN network unit 150 with the learning result (that is, the vector information learning result) when a replacement image is produced (or generated) (S108).

The learning phase (S101 to S108) may be repeatedly performed for another image (for example, a frame image) of the image search unit 110 and other instance objects in the extracted specific image (for example, a frame image).

When the preset mode is a production (generation) mode (production of S102), the instance object detection unit 120 detects an instance object (for example, an object to be learned or replaced) from the extracted image (for example, a frame image) (S109=S103).

Furthermore, the image extraction and object class information detection unit 130 extracts the mask-segmented objects from the extracted image (for example, a frame image), and forms a data-structure.

Furthermore, the standard image mapping unit 140 maps a standard image which is matches a class value (or ID) of the mask-segmented object and replaces the mask-segmented object (S111).

The GAN network unit 150 links (receives) a standard image for replacing the mask-segmented object and the mask segmentation image to (from) a publicly-known GAN network, and processes the received images (S112).

The GAN network unit 150 produces (or generates) a replacement image by using the learning result (that is, a vector information learning result) of the mask segmentation image (S113).

As described above, according to the present embodiment, it is possible to secure various datasets of a stylized thing (or object) through image synthesis using a segmentation mask image of things (or objects) detected in an image and a previously secured standard image database. Furthermore, according to the present embodiment, it is possible to more accurately secure various types of instance object data by discriminating the learning phase and the production phase and repeatedly learning various objects and images until the images are recognized as substantially the same image (that is, real) in the GAN (or the GAN network).

Although the inventive concepts have been described with reference to the embodiments illustrated in the drawings, the embodiments of the disclosure are for illustrative purposes only, and those skilled in the art will appreciate that various modifications and equivalent other embodiments are possible. Thus, the true technical scope of the disclosure should be defined by the following claims. Furthermore, the implementations described in the present specification may be implemented with a method or process, an apparatus, a software program, and a data stream or signal, for example. Although discussed only in the context of a single form of implementation (for example, discussed only as a method), implementations of the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

What is claimed is:

1. An automatic image synthesizing apparatus comprising:
    an image search unit configured to search for and extract a frame image having an object to be learned or replaced from a plurality of frame images inputted through a vehicle camera;
    an instance object detection unit configured to detect an instance object to be learned or replaced from the extracted frame image;
    an image extraction and object class information detection unit configured to extract mask-segmented objects from the extracted frame image and form a data-structure;
    a standard image mapping unit configured to map a standard image matching a class value of the mask-segmented object; and
    a generative adversarial network (GAN) network unit configured to receive the selected standard image and the mask segmentation image and learn a replacement image or produce a replacement image based on a learning result,
    wherein:
    the standard image includes a set of images of five surfaces, except for a bottom surface, when a dynamic object is viewed from an angle of a cube, and in a case of a static object, only a front surface having only information required for driving.

2. The automatic image synthesizing apparatus according to claim 1, wherein the image search unit searches for and extracts a frame image to be used in:
    a learning phase for replacing a specific object image included in the searched frame image; and
    a production phase for generating an object image to be replaced using learned learning information.

3. The automatic image synthesizing apparatus according to claim 1, wherein the instance object detection unit classifies objects in the extracted frame image in units of instances, and performs mask segmentation by finding segmentation for each pixel and class information of a corresponding object.

4. The automatic image synthesizing apparatus according to claim 1, wherein the standard image is stored in a standard image database.

5. The automatic image synthesizing apparatus according to claim 2, wherein the standard image mapping unit maps a standard image of an object to be learned in the learning phase and maps a standard image of an object to be replaced in the production phase.

6. The automatic image synthesizing apparatus according to claim 1, wherein the GAN network unit learns by repeatedly processing the standard image and the mask segmentation image until the standard image and the mask segmentation image are recognized as a substantially same image, and stores a learning result through a learning unit.

7. An automatic image synthesizing method comprising:
    searching for and extracting, by an image search unit, a frame image having an object to be learned or replaced from a plurality of frame images inputted through a vehicle camera;
    detecting, by an instance object detection unit, an instance object to be learned or replaced from the extracted frame image;

extracting, by an image extraction and object class information detection unit, mask-segmented objects from the extracted frame image and forming a data-structure;

mapping, by a standard image mapping unit, a standard image matching a class value of the mask-segmented object;

storing the standard image in a standard image database; and receiving, by a generative adversarial network (GAN) network unit, the selected standard image and the mask segmentation image and learning a replacement image or producing a replacement image based on a learning result, wherein the standard image includes a set of images of five surfaces, except for a bottom surface, when a dynamic object is viewed from an angle of a cube, and in a case of a static object, only a front surface having only information required for driving.

8. The automatic image synthesizing method according to claim 7, wherein, in the searching for and extracting of the frame image, the image search unit searches for and extracts a frame image to be used in:

a learning phase for replacing a specific object image included in the searched frame image; and a production phase for generating an object image to be replaced using learned learning information.

9. The automatic image synthesizing method according to claim 7, wherein, in the detecting of the instance object, the instance object detection unit classifies objects in the extracted frame image in units of instances, and performs mask segmentation by finding segmentation for each pixel and class information of a corresponding object.

10. The automatic image synthesizing method according to claim 8, wherein, in the mapping of the standard image, the standard image mapping unit maps a standard image of an object to be learned in the learning phase and maps a standard image of an object to be replaced in the production phase.

11. The automatic image synthesizing method according to claim 7, wherein, in the learning of the replacement image or producing of the replacement image, the GAN network unit learns by repeatedly processing the standard image and the mask segmentation image until the standard image and the mask segmentation image are recognized as a substantially same image, and stores a learning result through a learning unit.

* * * * *